United States Patent
Smith et al.

(10) Patent No.: US 8,088,498 B2
(45) Date of Patent: Jan. 3, 2012

(54) ELECTRO-FORMED SHEATH FOR USE ON AIRFOIL COMPONENTS

(75) Inventors: Blair A. Smith, South Windsor, CT (US); Aaron T. Nardi, East Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1256 days.

(21) Appl. No.: 11/752,355

(22) Filed: May 23, 2007

(65) Prior Publication Data

US 2010/0014964 A1    Jan. 21, 2010

(51) Int. Cl.
*B32B 15/04* (2006.01)

(52) U.S. Cl. ..... 428/678; 428/674; 428/675; 416/241 R; 415/200

(58) Field of Classification Search ............. None
See application file for complete search history.

(56) References Cited

U.S. PATENT DOCUMENTS

| | | | |
|---|---|---|---|
| 3,753,667 A * | 8/1973 | Metzger et al. | 428/639 |
| 4,366,034 A | 12/1982 | Ricks | |
| 4,441,857 A | 4/1984 | Jackson | |
| 4,802,828 A | 2/1989 | Rutz | |
| 4,943,485 A | 7/1990 | Allam | |
| 4,950,375 A | 8/1990 | Leger | |
| 5,306,120 A | 4/1994 | Hammer | |
| 5,427,866 A * | 6/1995 | Nagaraj et al. | 428/610 |
| 5,601,933 A | 2/1997 | Hajmrle | |
| 5,881,972 A | 3/1999 | Smith | |
| 5,908,285 A | 6/1999 | Graff | |
| 6,037,004 A | 3/2000 | Zajchowski | |
| 6,341,747 B1 | 1/2002 | Schmidt | |
| 6,638,639 B1 * | 10/2003 | Burke et al. | 428/583 |

FOREIGN PATENT DOCUMENTS

JP    63282295 A  * 11/1988

OTHER PUBLICATIONS

U.S. Patent Application "Low Cost, Environmentally Favorable, Chromium Plate Replacement Coating for Improved Wear Performance", U.S. Appl. No. 11/653,525, filed on Jan. 16, 2007.

* cited by examiner

*Primary Examiner* — Aaron Austin
(74) *Attorney, Agent, or Firm* — Carlson, Gaskey & Olds, P.C.

(57) ABSTRACT

An article for protecting an airfoil component includes a sheath having an outer side and an inner side that forms a cavity for receiving a leading edge of the airfoil component. The sheath is made of cobalt and phosphorus to protect the leading edge of the airfoil component from erosion.

15 Claims, 1 Drawing Sheet

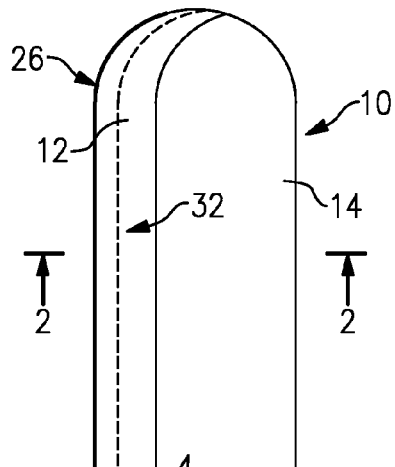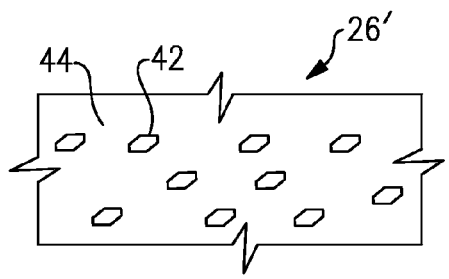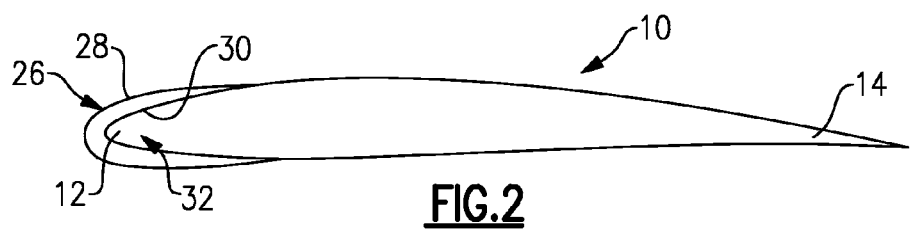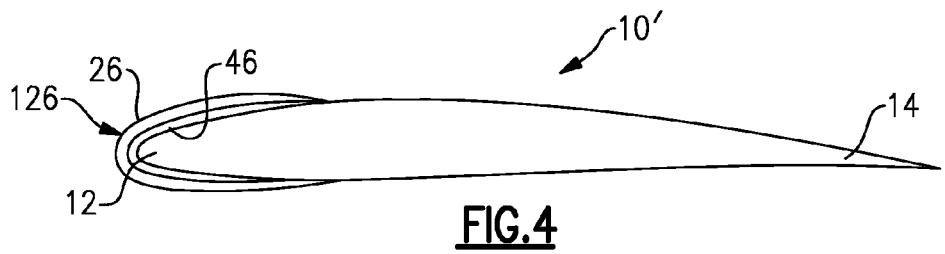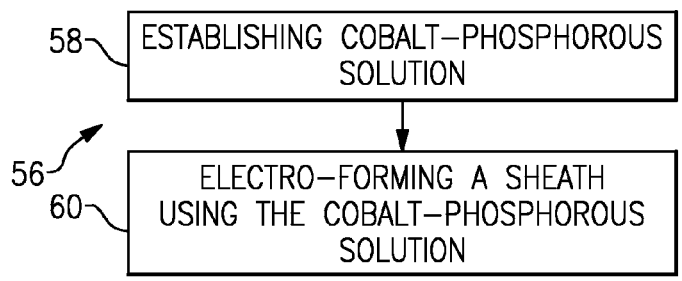

ELECTRO-FORMED SHEATH FOR USE ON AIRFOIL COMPONENTS

BACKGROUND OF THE INVENTION

This invention relates to protective sheaths and, more particularly, a protective sheath having cobalt and phosphorus for resisting erosion of propeller blades, vanes, turbine blades, or other airfoil components.

Airfoil-shaped components are used in various types of aircraft for propeller blades and engine components such as vanes and blades. The airfoil components are typically located within an air stream that may include foreign objects such as sand, ice, water droplets, stones, birds, or other debris. The foreign objects strike the airfoil component, particularly a leading edge of the airfoil component. Over time, the foreign object strikes may cause mechanical damage that changes the shape of the airfoil component, which is detrimental to aerodynamic efficiency. Airfoil components that are made of polymer composites may be particularly vulnerable to erosion because of the relatively soft nature of a polymer composite, although components made of other types of material are also vulnerable.

To protect the airfoil component, a sheath may be used on the leading edge of the airfoil component to resist erosion. Typically, the sheath is made from a hard material that can withstand cracking, fracture, chipping, and breaking from impact with the foreign objects.

Although conventional sheaths have been effective, there is a desire for improving erosion resistance to increase the durability and useful life of airfoil components. The erosion resistance available by using conventional sheaths is limited by the material used to make the sheath. For example, conventional sheaths have been made from titanium alloys or nickel alloys, which only provide limited sheath hardness and sheath strength for protecting the airfoil component.

Accordingly, there is a need for a sheath having a composition that provides enhanced erosion resistance for protecting airfoil components. This invention addresses those needs while avoiding the drawbacks and shortcomings of the prior art.

SUMMARY OF THE INVENTION

An example article for protecting a leading edge of an airfoil component includes a sheath having an outer side and an inner side that forms a cavity for receiving the leading edge of the airfoil component. The sheath includes a material having cobalt and phosphorus, and protects the leading edge of the airfoil component from erosion.

In one example, the sheath is received onto the leading edge of an airfoil component to protect the leading edge from erosion due to sand, ice, or other foreign objects within an air flow over the airfoil component.

An example method for manufacturing the sheath includes the steps of establishing an electro-forming solution having cobalt and phosphorus, and electro-forming the sheath using the solution. Optionally, the sheath may be hardened by including hard particulates within the electro-forming solution, by heat treating the sheath to form a hard precipitant, or both.

These and other features of the present invention can be best understood from the following specification and drawings, the following of which is a brief description.

BRIEF DESCRIPTION OF THE DRAWINGS

FIG. 1 illustrates an example airfoil component having a protective sheath.

FIG. 2 illustrates the airfoil component and protective sheath according to the section shown in FIG. 1.

FIG. 3 illustrates a selected portion of another embodiment of the sheath having hardening modifiers therein to increase the hardness of the sheath.

FIG. 4 illustrates a duplex sheath.

FIG. 5 illustrates an example method for manufacturing a sheath.

DETAILED DESCRIPTION OF THE PREFERRED EMBODIMENT

FIGS. 1 and 2 illustrate an example airfoil component 10, such as a propeller blade for an aircraft or wind turbine, an airfoil used within a gas turbine engine (e.g., an inlet guide vein, a compressor or turbine vein, or a compressor or turbine blade), or other type of airfoil. In the illustrated example, the airfoil component 10 includes a leading edge 12 and a trailing edge 14 relative to an air flow or expected air flow over the airfoil component 10. As can be appreciated, the airfoil component 10 may be made of any of a variety of different types of materials, such as a metallic alloy or polymer composite. In operation, the airfoil component 10, and particularly the leading edge 12, may be subjected to erosion from airborne objects such as water droplets, sand, stones, ice, birds or other objects.

To protect the airfoil component 10 from erosion, a sheath 26 is secured on the leading edge 12 of the airfoil component 10. The sheath 26 is relatively hard and mechanically tough compared to the airfoil component 10, and thereby protects the airfoil component 10 from erosion.

The sheath 26 includes an outer side 28 and an inner side 30. The inner side 30 forms a cavity 32 that corresponds in shape and size to the leading edge 12 of the airfoil component 10. The sheath 26 is fitted on the leading edge 12 such that the inner side 30 is adjacent the leading edge 12. For example, the sheath 26 is press-fit onto the leading edge 12. Alternatively, the sheath 26 may be secured onto the leading edge 12 in another suitable manner, such as with an adhesive, by using mechanical fasteners, or by forming the sheath 12 directly onto the airfoil component 10.

The sheath 26 is made of a material having cobalt and phosphorus to provide a desirable degree of erosion resistance and protection. Amounts of the cobalt and the phosphorus in the material may be selected based upon a desired erosion resistance of the sheath 26. That is, the amounts influence mechanical properties of the sheath 26 such as hardness and toughness, which correspond to the erosion resistance.

In one example, the material includes between about 4 weight % and about 6 weight % of the phosphorus with a balance amount being the cobalt. Forming the sheath 26 with this composition provides an "as-deposited" hardness of between about 608 VHN and about 645 VHN (Vicker's hardness), which is greater than materials previously used for sheaths. In another example, the material contains only phosphorus, cobalt, and trace amounts of unremovable or uncounted impurities, as the addition of other elements may materially affect the mechanical properties or thermal resistance.

The hardness of the sheath 26 may be determined using known hardness measurement methods, such as indentation using a 100 gram load or other preselected load. The term "about" as used in this description relative to compositions refers to possible variation in the compositional percentages, such as normally accepted variations or tolerances in the art.

The term "about" as used relative to hardness refers to statistical variation in measurements of the hardness.

FIG. 3 illustrates a selected portion of another embodiment of a sheath 26'. In this example, the sheath 26' includes hardening modifiers 42 dispersed within a matrix 44 made of the material having cobalt and phosphorus as described above. For example, the hardening modifiers 42 are precipitants formed during a heat treating step, particulates that are deposited within the matrix 44 during formation of the sheath 26', or a combination thereof.

In one example, the hardening modifiers 42 are hard particulates dispersed within the matrix 44. For example, the hard particulates are silicon carbide particulates, chromium carbide particulates, diamond particulates, or combinations thereof.

In another example, the hardening modifiers 42 include a cobalt-phosphate precipitant that is formed by heat treating at a selected temperature for a predetermined amount of time. The heat treatment provides the sheath 26' with a hardness between about 1002VHN and about 1032 VHN. The selected heat treating temperature depends on whether the sheath 26' includes particulates or not. For example, if the sheath 26' is particulate-free, the matrix 44 is heat treated at a temperature of about 600° F. for about 90 minutes to form the cobalt-phosphate precipitants. If the sheath 26' includes particulates, the matrix 44 is heat treated at a temperature of about 750° F. for about 90 minutes. Given this description, one of ordinary skill in the art would be able to determine suitable temperatures and times for achieving a desired hardness for a given sheath composition.

FIG. 4 illustrates another example airfoil component 10' that is similar to the airfoil component 10 in the above examples but includes a duplex sheath 126. In this example, the duplex sheath 126 includes the sheath 26 (or 26') of the previous examples in combination with an inner layer 46 (i.e., a duplex layer) between the sheath 26 and the leading edge 12. The duplex sheath 126 provides an additional measure of erosion protection by utilizing two layers. For example, the inner layer 46 is a nickel alloy, a nickel alloy having cobalt, copper, a copper alloy, an iron alloy, or steel. The inner layer 46 further protects the leading edge 12 from erosion in the event that a portion of the sheath 26 erodes away to expose the inner layer 46. The distinct color of the copper or the copper alloy may provide an additional benefit by functioning as a visual indicator that a portion of the sheath 26 has eroded away.

FIG. 5 illustrates an example method 56 for manufacturing the sheath 26, 26', 126. In this example, the method 56 includes a step 58 of establishing an electro-forming solution having cobalt and phosphorus. The electro-forming solution is used at step 60 to electro-form the sheath 26, 26', 126.

In one example, the electro-forming solution includes a bath having about 180-210 grams per liter of cobalt chloride, from about 0.05 to about 2.0 grams per liter of cobalt carbonate, from about 45 to about 55 grams per liter of orthophosphoric acid, and from about 5.0 to about 15 grams per liter of phosphorus acid. Optionally, if the sheath 26, 26', 126 is to include particulate forms of the hardening modifiers 42, a selected volume of the particulates is added to the electro-forming solution. For example, between about 5 and 30 volume % of the particulates are added to the electro-forming solution and agitated during the electro-forming step 60 to evenly distribute the particulates through the sheath 26, 26', 126 during formation thereof.

Optionally, the electro-forming solution may include other substances to modify the resultant sheath 26, 26', 126, such as organic brightening agents, (e.g., ortho-formylbenzene sulphonic acid, naphthalene tri-sulphonic acid, saccharin, or other known modifiers). Incorporation of these agents may serve to increase the hardness of the sheath 26, 26', 126 or modify the microstructure of the sheath 26, 26', 126 as is generally known in electro-forming.

The sheath 26, 26', 126 formed at the electro-forming step 60 may be formed directly onto the airfoil component 10, 10' or onto a mandrel that is later removed. For example, the mandrel may be formed from titanium, stainless steel, or nickel. Additionally, after electro-formation, the sheath 26, 26', 126 may be machined for smoothness and/or to smooth and contour the cavity 32 for a tight fit with the leading edge 12. In one example, the sheath 26, 26', 126 is formed with particulates according to parameters disclosed in co-pending application Ser. No. 11/653,525, filed Jan. 16, 2007.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An article for protecting an airfoil, comprising:
a sheath having an outer side and an inner side that forms a cavity for receiving the airfoil, wherein the sheath comprises a material having cobalt and phosphorus and a duplex layer adjacent the inner side.

2. The article as recited in claim 1, wherein the sheath includes a cobalt phosphate precipitant distributed within a matrix having the cobalt and the phosphorus.

3. The article as recited in claim 1, wherein the sheath comprises an as-formed hardness between about 608 VHN and about 645 VHN.

4. The article as recited in claim 1, wherein the sheath comprises a hardness between about 1002 VHN and about 1032 VHN.

5. The article as recited in claim 1, wherein the duplex layer comprises an alloy material selected from a group consisting of a nickel alloy, a nickel alloy having cobalt, copper, copper alloy, an iron alloy, and steel.

6. The article as recited in claim 1, wherein the cavity has a shape of a leading edge of the airfoil.

7. The article as recited in claim 1, wherein the sheath consists essentially of phosphorous and cobalt.

8. The article as recited in claim 1, wherein the sheath consists essentially of between about 4 weight % and about 6 weight % of the phosphorous and a balance of the cobalt.

9. An airfoil component comprising:
an airfoil having a leading edge and a trailing edge; and
a sheath for protecting the airfoil, the sheath having an outer side and an inner side that forms a cavity, wherein the inner side is adjacent the leading edge of the airfoil and the sheath consists essentially of phosphorous and cobalt.

10. The airfoil component as recited in claim 9, wherein the airfoil comprises a metallic alloy.

11. The airfoil component as recited in claim 9, wherein the airfoil comprises a polymer composite.

12. The airfoil component as recited in claim 9, wherein the sheath consists essentially of between about 4 weight % and about 6 weight % of the phosphorous and a balance of the cobalt.

13. The airfoil component as recited in claim 9, wherein the sheath includes a duplex layer adjacent the inner side.

14. An article for protecting an airfoil, comprising:

a sheath having an outer side and an inner side that forms a cavity for receiving the airfoil, wherein the sheath comprises a material having cobalt and phosphorus, the sheath further including a duplex layer adjacent the inner side and the duplex layer, wherein the duplex layer is copper.

15. An article for protecting an airfoil, comprising:

a sheath having an outer side and an inner side that forms a cavity for receiving the airfoil, wherein the sheath comprises a material having cobalt and phosphorus, the sheath further including a duplex layer adjacent the inner side and the duplex layer, wherein the duplex layer is copper alloy.

* * * * *